Dec. 4, 1962     R. H. COLE     3,066,607
MODULATED ELECTROMAGNETIC PUMP
Filed Jan. 15, 1958     2 Sheets-Sheet 1

INVENTOR.
RICHARD H. COLE
BY Joseph E. Ryan
ATTORNEY

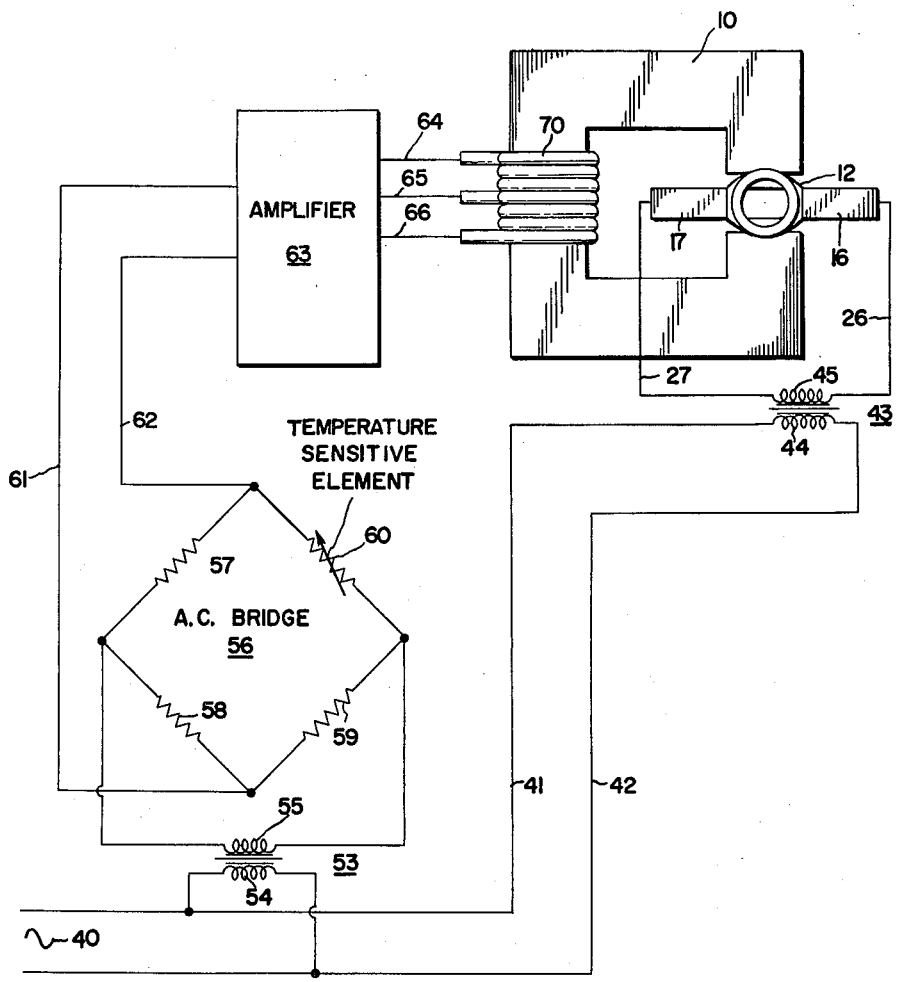

United States Patent Office 3,066,607
Patented Dec. 4, 1962

3,066,607
MODULATED ELECTROMAGNETIC PUMP
Richard H. Cole, St. Louis Park, Minn., assignor to Minneapolis-Honeywell Regulator Company, Minneapolis, Minn., a corporation of Delaware
Filed Jan. 15, 1958, Ser. No. 709,049
10 Claims. (Cl. 103—1)

This invention relates to a modulated type of electromagnetic conductive fluid pump or apparatus and more specifically relates to a mode of operation wherein a self-induced magnetic field or flux is utilized in a beneficial manner.

Electromagnetic conductive fluid pumps have been long known in the art and are often referred to as faraday pumps. In their usual form, they comprise a non-conductive tube filled with a conductive fluid which passes through a magnetic field. Inserted in the sides of the tube at right angles to the magnetic field are two electrodes which act to conduct a current through the magnetic field by means of the fluid in the tube. When the current and the magnetic field are in phase with each other and at substantially right angles, a force mutually perpendicular to the current and field is created in the fluid. This force propels the fluid in the tube in a manner quite similar to the usual type of pump.

In operating the electromagnetic conductive fluid pump it has been previously recognized that the current flowing between the electrodes and through the conductive fluid generates a magnetic field or flux in the magnetic structure associated with the pump. This self-induced magnetic field has normally been treated in one of three ways by the prior art. The first is to ignore this self-induced magnetic field. When this field is ignored an adequate supplemental field is added so as to override the self-induced field and make its effect negligible in the output of the electromagnetic pump. The second approach to this self-induced magnetic field is to utilize it fully as the sole magnetic field. When the self-induced magnetic field is utilized as the sole energizing field for an electromagnetic type pump, relatively complex current paths are provided to obtain a maximum utilization. The third approach is to cause the current to return across the tube in a second path and thereby cancel its own effect. The presently disclosed electromagnetic conductive fluid pump recognizes the existence of the self-induced magnetic field and utilizes it in combination with an additional controllable field to yield a simple means of modulating the fluid pressure developed within the device.

The primary object of the present invention is to disclose a simplified method of modulating a conductive fluid pump.

Another object of the novel arrangement disclosed is to utilize the self-induced magnetic flux or field of an electromagnetic type of conductive fluid pump to obtain a device that has an exceedingly low power consumption or input.

Still another object of the present novel arrangement is to disclose a simplified means of operation for obtaining modulation which can be adapted to the majority of existing configurations and constructions of electromagnetic conductive fluid pumps without costly changes or reconstruction of the unit.

These and other objects will become apparent from a careful consideration of the following specification when considered fully with the accompanying two sheets of drawings, wherein.

Figure 2:
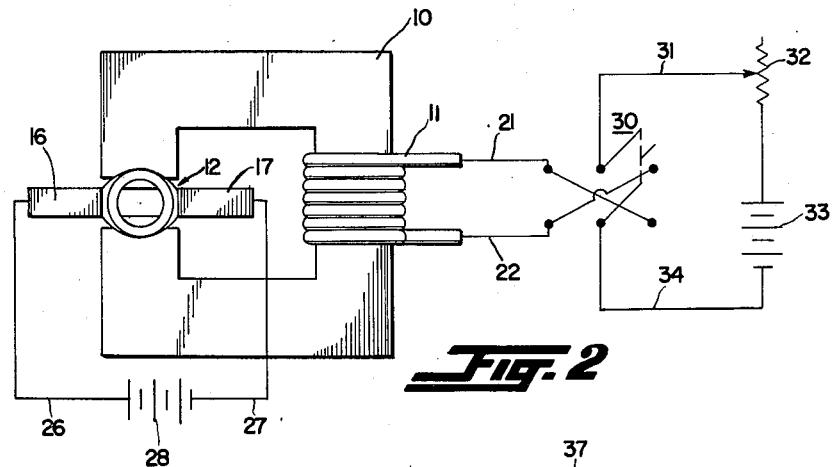
FIGURE 2 is a schematic representation of the pump of FIGURE 1 when utilized in a manually operated modulating system.
Figure 3:
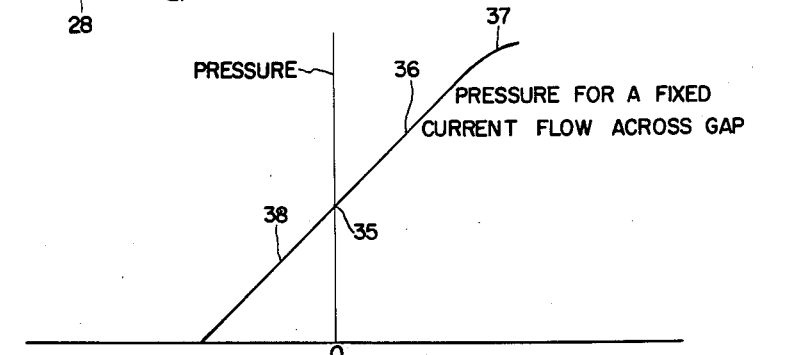

FIGURE 3 is a representative graph of Pressure Output versus the Field Energization, and which closely approximates actual data taken in an arrangement similar to that shown in FIGURE 2; and FIGURE 4 is a representative schematic of a commercially usable temperature sensing and control system having full modulation of an electromagnetic conductive fluid pump which in turn can be used to operate a control device.

Figure 1:
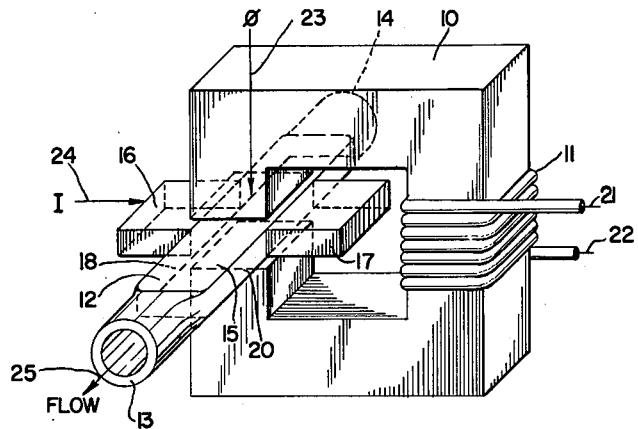
FIGURE 1 is an isometric representation of a conventional faraday pump which will be utilized to fully explain the theory of operation.

In order to more fully explain the operation of the present device a faraday type pump has been disclosed in FIGURE 1. The pump consists of a C-shaped magnetic core structure 10 having a coil of wire or energizing winding 11 wrapped around one leg. Passing through the opening or gap of the C-shaped core 10 is a fluid flow channel or conduit 12. The conduit 12 is designed to carry a conductive fluid. The conductive fluid used is most commonly in the form of a conductive liquid such as a liquid metal. Typical examples of liquid metals that are used in such devices are mercury, sodium, potassium, and sodium-potassium mixtures. Mercury and sodium-potassium mixtures are normally in their liquid state at and below normal ambient temperatures. The conduit 12 can be formed of any convenient insulating material or can be made up of a high resistance type metal wherein the conductivity of the metal is substantially less than the conductivity of the fluid which it contains. In the present embodiment the conduit 12 can thus be considered as formed from a tube of a high resistance type of metal. As such, the conduit 12 has tubular ends 13 and 14 and a flattened middle section 15. The flattened middle section 15 has a rectangular cross section and thereby conveniently fits within poles of the gap of the C-shaped magnetic structure 10. In the present disclosure the C-shaped magnetic structure has been disclosed as a solid material, but for alternating current applications the structure 10 could well be formed of a laminated material.

Two electrodes 16 and 17 are inserted into the sides 18 and 20 of the flattened portion 15 of conduit 12. The electrodes 16 and 17 can either be completely inserted into the walls 18 and 20 and properly sealed or the electrodes 16 and 17 may be electrically joined to the outer surface of the walls 18 and 20.

To operate the pump disclosed in FIGURE 1 two sources of power (not shown) would be required. The first source would be connected to coil 11 through conductors 21 and 22 to provide a magnetic field in the core 10. The magnetic field is schematically represented by an arrow 23 marked $\phi$. In the conventional form of electromagnetic pump, the energization of coil 11 would be such that the core 10 would have a field or flux $\phi$ which saturates the core thereby providing the maximum flux density in the gap of core 10. An additional power source (not shown) would be connected to electrodes 16 and 17 to pass a current through the conduit 12 between the walls 18 and 20. The current has been represented by an arrow 24 and normally would be of a very high amperage and an exceedingly low voltage. The current 24 flowing across the channel or conduit 12 at right angles to the flux would interact to create a pumping pressure within a fluid contained in the conduit 12. The fluid would be forced to flow in a direction mutually perpendicular to the flux or field $\phi$ and the current 24. The direction of flow has been represented by an arrow 25. The principle of operation of this unit has been long known as it was originally recognized by Faraday.

The presently disclosed invention is based upon a phenomenon which occurs within the pump disclosed in FIGURE 1 but which has either been overlooked or generally considered as detrimental to the operation of the pump. It is known that whenever an electric current flows a magnetic field or flux is generated. As such, it is obvious that when the current 24 flows between the electrodes 16 and 17 it has a self-induced magnetic field or flux. This magnetic field or flux is also present in the core 10. In most applications this flux is not enough to saturate the core 10 and is substantially less than the flux generated by the energization of coil 11. Since the self-induced flux is substantially less than the super-imposed flux generated by the coil 11 it has generally been disregarded. In some cases this phenomenon has been recognized and measures have been taken to cancel the self-generated flux out. Generally this is accomplished by returning the current 24 back across the gap in the C-shaped magnetic structure 10. The back and forth flow of the current 24 thereby eliminates any flux which would be generated by the current flow itself. In the present invention this self-generated flux is not overlooked but is advantageously utilized. If the current 24 flowing between electrodes 16 and 17 is allowed to react with its self-induced flux a definite pumping pressure will be developed in the conduit 12. If this self-induced flux is aided by a slight additional flux generated by coil 11 the pumping pressure will increase in the same direction as the pressure created by the interaction of the self-induced flux and the current. If however, the coil 11 were energized in a manner to develop a flux which opposes the self-induced flux, the pumping pressure is decreased. A manner in which this phenomenon can be demonstrated is disclosed in FIGURE 2, while a typical curve of data taken from an experimental arrangement as shown in FIGURE 2 can be seen in FIGURE 3.

More specifically, in FIGURE 2 there is disclosed the core 10, the winding 11, conduit 12, electrode 16, and electrode 17. Electrodes 16 and 17 are connected by conductors 26 and 27 to a battery 28. The coil 11 which has conductors 21 and 22 is connected to a double pole, double throw switch shown schematically at 30. A central terminal of the switch 30 is connected by conductor 31 to a variable resistance 32 and then in turn to a battery 33. The battery 33 is then connected by conductor 34 to the opposite side of switch 30. It is obvious from this arrangement that the coil 11 can be energized to provide a flux 23 in the core 10. This flux can be conveniently reversed by reversing the switch 30 from the right hand to left hand positions. It is also apparent that the amount of current flowing in the coil 11 can be controlled by variations in the variable resistance 32.

If the battery 28 supplies current to electrodes 16 and 17 when switch 30 is in the position shown, that is completely open, there is created a definite pumping pressure due to the interaction of the current flowing between electrodes 16 and 17 with its self-induced field or flux. In FIGURE 3 this is represented on the graph by the pumping pressure noted at point 35 when the field is zero. If the switch 30 is thrown to an energizing position to connect the coil 11 to the series resistor 32 and battery 33 a varying amount of current can be supplied to coil 11 to form a variable magnetic field generating means. If the flux generated by the coil 11 adds to the self-induced flux the portion of the curve disclosed in FIGURE 3 at 36 is created. As the energization of the coil 11 is increased to the point of saturation of the core 10, the curve rounds out at 37 and then becomes substantially flat. If the switch 30 is reversed so that the energization induced by coil 11 opposes the energization induced by the current flow between electrodes 16 and 17, a partial cancellation of the self-induced flux occurs. This is represented by the portion 38 of the curve disclosed in FIGURE 3.

It is obvious from the curve developed in FIGURE 3 that a wide variation of pumping pressure can be obtained by varying the external current to coil 11 and thence the energizing field created by coil 11. This arrangement therefore provides for an easy method of modulating the pressure of a Faraday type pump by operating to either side of the pressure created by the self-induced flux and the current passing across the channel. The principle developed for modulating a conductive fluid pump as disclosed in FIGURES 1 to 3 is applied to a practical circuit as disclosed in FIGURE 4. In FIGURE 4 there is disclosed an energizing means in the form of an alternating current source 40 which is connected by connection means including conductors 41 and 42 to a transformer 43 which has a primary winding 44. The power source 40 is further connected to a transformer 53 which has a primary winding 54. The transformers 43 and 53 are operated in a parallel relationship so that the phase between the outputs of these two transformers can be made to have a fixed relationship. Transformer 53 has a secondary winding 55 which is connected to an alternating current condition responsive bridge means generally shown as bridge 56. An alternating current bridge of the arrangement disclosed is well known and contains three fixed resistances 57, 58 and 59. The bridge also contains a fourth resistance 60 which in the present disclosure is a temperature sensitive element which increases and decreases with its exposure to changing ambient temperatures. Resistance 60 serves the same function as a conventional thermostat in a heating control system. It is obvious that at some particular point the bridge 56 is balanced and has no output on conductors 61 and 62. However, at any other point the output of the bridge is supplied to conductors 61 and 62 and is of a reversing nature upon a reversal of the temperature about the control point at which the resistance 60 is set.

The conductors 61 and 62 are connected to an amplifier means generally shown as 63. The amplifier means can be a conventional amplifier which is capable of providing an output on conductors 64, 65 and 66 which is a function of the phase and magnitude of the input on conductors 61 and 62. The bridge 56 and the amplifier 63 are well known to those versed in the art and could be of a type which is disclosed in Patent 2,446,563 to A. P. Upton which is assigned to the assignee of the present invention. It is therefore believed that further discussion of these elements is not necessary. It is only believed necessary to state that if the unbalance of the bridge 56 is in one direction the output of the amplifier 63 is of a fixed phase. If the output of the bridge 56 reverses the output of the amplifier 63 also reverses. The output of amplifier 63 on conductors 64, 65, and 66 is to a coil of wires generally shown as 70. The coil of wires 70 corresponds generally to the coil of wire 11 of FIGURE 1. The only difference is that the coil of wire 70 has in effect two coils of wire similar to that disclosed in FIGURE 1 as coil 11. With the present arrangement if the amplifier 63 provides an output on conductors 64 and 65 of one phase, a definite direction of flux is created in the magnetic core 10. If the amplifier 63 has an output on conductors 65 and 66 which is opposite to the previous output, the direction of flux in core 10 is reversed. It is obvious from this that a flux relationship similar to that disclosed in FIGURE 2 can therefore easily be obtained by the bridge 56 and the amplifier 63 within the core 10. The core 10 in FIGURE 4 is identical to that of FIGURE 1 and has an opening through which the conduit 12 passes. The conduit has electrodes 16 and 17 which are connected by leads 26 and 27 to a transformer secondary 45 of the transformer 43.

The transformer 43 provides a very high current at a low voltage and is phased with transformer 53 so that the energization of the bridge 56 and the amplifier 63 is such as to contain the necessary relationship of a current and flux flowing in phase or 180° out of phase to provide a pumping pressure within the channel 12. With the arrangement disclosed in FIGURE 4, any unbalance created in bridge 56 by a change in temperature and the temperature sensitive element 60, will cause the amplifier to have a variable output. The output on conductors 64, 65 and 66 will energize the coil 70 in such a manner as to either add to or oppose the self-induced field supplied by current between electrodes 16 and 17. The direction of flow of a fluid within the channel 12 will depend upon the phase relationship between the self-induced flux and the flux generated by coil 70 and will vary in magnitude with the magnitude of the resultant or effective flux. It is obvious that as the bridge 56 is more and more unbalanced that the magnitude of the flux generated by the coil 70 increases. With this arrangement the flux relationship and current relationship in the gap of the core 10 is the same as that disclosed in FIGURE 3 and a varying pressure is therefore generated. This pressure can be utilized to operate an appropriate hydraulic or pneumatic actuator. More specifically, the modulated fluid flow could be applied to an actuator and a hot water or steam valve to control the temperature of a space wherein the temperature sensitive element 60 is located. An actuator and valve of this type are disclosed in the Carlson patent 2,948,118, issued August 9, 1960, and which is assigned to the assignee of the present invention. With this arrange therefore a complete modulating control system has been disclosed which utilizes a new and unique principle.

The present application has been illustrative only of the principle involved and one of the many possible applications of this principle. Since those versed in the art will be able to apply this principle to many physical configurations the applicant wishes to be limited in scope only by the appended claims.

I claim as my invention:

1. A modulating electromagnetic liquid metal apparatus of the class described: a liquid metal flow channel including a pair of electrodes disposed opposite to each other; a liquid metal filling said channel; a magnetic core structure having a pair of poles mutually perpendicular to said channel and said electrodes, current source means passing a current between said electrodes through said metal; said current creating a self-induced magnetic field in said core structure; reversible magnetic field generating means creating a second magnetic field within said core structure; and said magnetic fields combining to create a undirectional resultant magnetic field in said core structure; said resultant magnetic field and said current creating a force in the liquid metal tending to move the metal in the channel, the magnitude of the force being related to the direction and magnitude of said second magnetic field and said current.

2. A modulating electromagnetic conductive fluid apparatus of the class described: a fluid flow channel including a pair of electrodes disposed opposite to each other; a conductive fluid filling said channel; a magnetic core structure having a pair of poles mutually perpendicular to said channel and said electrodes; current source means passing a current between said electrodes through said fluid; said current creating a self-induced magnetic field in said core structure; reversible magnetic field generating means creating a second magnetic field within said core structure; and said magnetic fields combining to create a unidirectional resultant magnetic field in said core structure; said resultant magnetic field and said current creating a force in the fluid tending to move the fluid in the channel; the magnitude of the force being related to the direction and magnitude of said second magnetic field and said current.

3. In a modulating control system: condition responsive bridge means; amplifier means having connection means connecting said bridge means to said amplifier means; an electromagnetic liquid metal pump including conduit means with opposed electrode means wherein a liquid metal is caused to flow by means generating an electric current and an effective magnetic field angularly disposed to each other and to the direction of flow of the liquid; said electric current creating a self-induced magnetic field; said pump further including magnetic core means having legs and a plurality of coils of wire encircling a leg of said pump; further connection means connecting said amplifier means to said coils of wire; and said amplifier means and said coils of wire generating a reversible variable magnetic field that does not exceed said self-induced field; said self-induced magnetic field and said variable magnetic field interacting wherein said variable magnetic field adds to or subtracts from said self-induced field to create said effective magnetic field; said effective magnetic field and said electric current disposed to move said liquid metal in relationship to the magnitude of the effective magnetic field in response to said condition responsive bridge means.

4. In a modulating control system: condition responsive bridge means; amplifier means having connection means connecting said bridge means to said amplifier means; an electromagnetic conductive liquid pump including conduit means with opposed electrode means wherein a conductive liquid is caused to flow by means generating an electric current and an effective magnetic field angularly disposed to each other and to the direction of flow of the liquid; said electric current creating a self-induced magnetic field; said pump further including magnetic core means having legs and a plurality of coils of wire encircling a leg of said pump; further connection means connecting said amplifier means to said coils of wire; and said amplifier means and said coils of wire generating a reversible variable magnetic field that does not exceed said self-induced field; said self-induced magnetic field and said variable magnetic field interacting wherein said variable magnetic field adds to or subtracts from said self-induced field to create said effective magnetic field; said effective magnetic field and said electric current disposed to move said liquid in relationship to the magnitude of the effective magnetic field in response to said condition responsive bridge means.

5. In a modulating control system: condition responsive means including connection means; an electromagnetic conductive fluid pump including conduit means with opposed electrode means wherein a conductive fluid is caused to flow by means generating an electric current and an effective magnetic field angularly disposed to each other and to the direction of flow of the fluid; said electric current creating a self-induced magnetic field; said pump further including including magnetic core means having legs and a pluraliy of coils of wire encircling a leg of said pump; and said condition responsive means connected to said coils of wire through said connection means and generating therewith a reversible variable magnetic field; said self-induced magnetic field and said variable magnetic field interacting wherein said variable magnetic field adds to or subtracts from said self-induced field to create said effective magnetic field; said effective magnetic field and said electric current disposed to move said fluid in relationship to the magnitude of the effective magnetic field in response to said condition responsive means.

6. A modulating electromagnetic conductive liquid apparatus of the class described: condition responsive bridge means; amplifier means having connection means connecting said bridge means to said amplifier means; a liquid flow channel including a pair of electrodes disposed opposite to each other; a conductive liquid filling said channel; a magnetic core structure having a pair of poles mutually perpendicular to said channel and said electrodes; current source means passing a current between said electrodes through said liquid; said current creating a self-induced magnetic field in said core structure; reversible magnetic field generating means for generating a reversible magnetic field and including further connection means connecting said amplifier means to said reversible field generating means; said reversible magnetic field generating means creating a second magnetic field within said core structure that does not exceed the self-induced flux in magnitude and operating in response to said bridge means; and said magnetic field combining to create a unidirectional resultant magnetic field in said core structure; said resultant magnetic field and said current creating a force in the liquid tending to move the liquid in the channel; the magnitude of the force being related to the direction and magnitude of said second magnetic field and said current.

7. A modulating electromagnetic conductive fluid apparatus of the class described: condition responsive means including connection means; a fluid flow channel including a pair of electrodes disposed opposite to each other; a conductive fluid filling said channel; a magnetic core structure having a pair of poles mutually perpendicular to said channel and said electrodes; current source means passing a current between said electrodes through said fluid; said current creating a self-induced magnetic field in said core structure; reversible magnetic field generating means for generating a reversible magnetic field which is controlled in response to said condition responsive means through said connection means and creating a second magnetic field within said core structure that does not exceed the self-induced flux in magnitude; and said magnetic fields combining to create a unidirectional resultant magnetic field in said core structure; said resultant magnetic field and said current creating a force in the fluid tending to move the fluid in the channel; the magnitude of the force being related to the direction and magnitude of said second magnetic field and said current.

8. A method of operating an electromagnetic conductive fluid pump wherein a conductive fluid is caused to flow by an electric current and an effective magnetic field angularly disposed to each other and to the direction of fluid flow, which method comprises: supplying an electric current to the pump which generates a self-induced magnetic field mutually perpendicular to the current and the flow of fluid to create a pumping action; supplying a controlled magnetic field; and varying the controlled magnetic field so as to add to or subtract from the self-induced magnetic field to provide an effective field which varies the level of energization of the pump according to the effective field to vary the output of the pump.

9. A method of modulating an electromagnetic conductive fluid pump wherein a conductive fluid is caused to flow by an electric current and an effective magnetic field angularly disposed to each other and to the direction of fluid flow, which method comprises: supplying an electric current to the pump which generates a self-induced magnetic field mutually perpendicular to the current and the flow of fluid to create a pumping action; supplying a controlled magnetic field that is responsive to a condition responsive device; and varying the controlled magnetic field so as to add to or subtract from the self-induced magnetic field to provide an effective field which varies the level of energization of the pump according to the effective field to modulate the output of the pump in response to the condition responsive means.

10. A method of modulating an electromagnetic conductive fluid pump wherein a conductive fluid is caused to flow by an electric current and an effective magnetic field angularly disposed to each other and to the direction of fluid flow, which method comprises: supplying an electric current to the pump which generates a self-induced magnetic field mutually perpendicular to the current and the flow of fluid to create a pumping action; supplying a controlled magnetic field of a magnitude that does not exceed the self-induced field and that is responsive to a condition responsive device; and varying the controlled magnetic field so as to add to or subtract from the self-induced magnetic field to provide an effective field which varies the level of energization of the pump according to the effective field to modulate the output of the pump in response to the condition responsive means.

References Cited in the file of this patent

UNITED STATES PATENTS

| | | |
|---|---|---|
| 853,789 | Holden | May 14, 1907 |
| 1,736,643 | Beck | Nov. 19, 1929 |
| 1,792,449 | Spencer | Feb. 10, 1931 |
| 2,258,415 | Lago | Oct. 7, 1941 |
| 2,375,988 | Gille | May 15, 1945 |
| 2,434,705 | Lago | Jan. 20, 1948 |
| 2,748,710 | Vandenberg | June 5, 1956 |
| 2,770,590 | Serduke | Nov. 13, 1956 |
| 2,798,434 | Brill et al. | July 9, 1957 |
| 2,848,409 | Szechtman | Aug. 19, 1958 |
| 2,934,900 | Robinson | May 3, 1960 |
| 2,948,118 | Carlson et al. | Aug. 9, 1960 |
| 2,962,718 | Hilgert | Nov. 29, 1960 |